United States Patent
Shin

(10) Patent No.: US 9,434,295 B2
(45) Date of Patent: Sep. 6, 2016

(54) APPARATUS FOR DRIVING HEADLIGHT COVER

(71) Applicant: HYUNDAI MOTOR COMPANY, Seoul (KR)

(72) Inventor: Jik Soo Shin, Incheon (KR)

(73) Assignee: Hyundai Motor Company, Seoul (KR)

( * ) Notice: Subject to any disclaimer, the term of this patent is extended or adjusted under 35 U.S.C. 154(b) by 83 days.

(21) Appl. No.: 14/609,327

(22) Filed: Jan. 29, 2015

(65) Prior Publication Data

US 2016/0102830 A1   Apr. 14, 2016

(30) Foreign Application Priority Data

Oct. 10, 2014   (KR) .................... 10-2014-0136443

(51) Int. Cl.
  *B60Q 1/04*  (2006.01)
  *F21S 8/10*  (2006.01)

(52) U.S. Cl.
  CPC ............ *B60Q 1/04* (2013.01); *F21S 48/1789* (2013.01); *F21S 48/1794* (2013.01)

(58) Field of Classification Search
  CPC .......... F21S 48/1789; F21S 8/10; F21S 8/12; F21S 48/1794; F21S 48/00; F21S 48/10; F21S 48/14; F21S 48/142; F21S 48/145; F21S 48/147; B60Q 1/04; B60Q 1/06; B60Q 1/068; B60Q 1/076; F21V 14/00; F21V 14/006
  See application file for complete search history.

(56) References Cited

U.S. PATENT DOCUMENTS

| | | | | |
|---|---|---|---|---|
| 7,926,992 B2 * | 4/2011 | Kim | .................... | F21S 48/1794 362/283 |
| 8,740,431 B2 * | 6/2014 | Jeong | .................... | B60Q 1/085 362/538 |
| 8,874,312 B2 * | 10/2014 | Park | .................... | B60Q 1/143 315/82 |
| 9,335,019 B2 * | 5/2016 | Dreβler | ................. | F21S 48/145 |

FOREIGN PATENT DOCUMENTS

| | | |
|---|---|---|
| JP | 05-97004 U | 12/1993 |
| JP | 2005-259473 A | 9/2005 |
| JP | 2010-015693 | 2/2010 |
| JP | 2010-086863 A | 4/2010 |
| KR | 10-2010-0025253 A | 3/2010 |
| KR | 10-2012-0011213 A | 2/2012 |
| KR | 10-2012-0070081 A | 6/2012 |

OTHER PUBLICATIONS

Korean Notice of Allowance issued in Application No. 10-2014-0136443 dated Feb. 23, 2016.

* cited by examiner

*Primary Examiner* — Bao Q Truong
(74) *Attorney, Agent, or Firm* — McDermott Will & Emery LLP

(57) ABSTRACT

An apparatus for driving a headlight cover includes a rotary shaft rotated by a motor and covered with shields. A rotary member extends from the rotary shaft, rotates with the rotary shaft, and has at least one protrusion on a surface. A plurality of guides are fitted around the rotary member and have grooves on inner sides, respectively, to receive the protrusion of the rotary member. An elastic member is fitted on the guides.

13 Claims, 7 Drawing Sheets

APPARATUS FOR DRIVING HEADLIGHT COVER

CROSS REFERENCE TO RELATED APPLICATION

The present application claims the benefit of priority to Korean Patent Application Number 10-2014-0136443 filed on Oct. 10, 2014, the entire contents of which application are incorporated herein for all purposes by this reference.

TECHNICAL FIELD

The present disclosure relates to an apparatus for driving a headlight cover using a direct current (DC) motor.

BACKGROUND

A headlamp is a device that illuminates the forward area from a vehicle and supplies sufficient brightness to illuminate an obstacle at a certain distance, for example 100 m, ahead on a road at night. The standards for specifications of headlamps depend on countries.

Automotive headlamps are required to provide an optimal driving environment in accordance with driving conditions of a vehicle, conditions of a road, and surrounding brightness. To this end, an adaptive front lighting system that changes a light distribution pattern in accordance with the driving conditions of a vehicle has recently been used.

Such an adaptive front lighting system adaptively changes a light distribution pattern in accordance with the driving conditions of a vehicle, using a plurality of light shields that determine light distribution patterns by blocking a portion of light from a light source. When the plurality of light shields are used, shields having different patterns are disposed along a cylindrical cover, and light distribution patterns are adjusted by turning the cylindrical cover. In the related art, a stepper motor was used to turn headlight covers, so it was possible to accurately control the positions of the shields.

However, a specific exclusive logic with complicated power supply to supply pulse signals in order to activate the stepper motor and a specific sensor to store an initial operation position are necessary. Accordingly, a structure of the system is complicated, and manufacturing cost is high.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. An aspect of the present inventive concept provides an apparatus for driving a headlight cover with a DC motor using a rotary member extending from a cover rotary shaft and a plurality of guides and elastic members.

According to an exemplary embodiment of the present inventive concept, an apparatus for driving a headlight cover includes a rotary shaft rotated by a motor and covered with shields. A rotary member extends from the rotary shaft, rotates with the rotary shaft, and has at least one protrusion on a surface. A plurality of guides are fitted around the rotary member and have grooves on inner sides, respectively, to receive the at least one protrusion of the rotary member. An elastic member is fitted on the guides.

The motor may be a direct-current (DC) motor.

Each of the guides may further have a support that extends the elastic member when the guides rotate with the rotary shaft.

A support of a first guide of the plurality of guides may be coupled to a first end of the elastic member to extend the elastic member in a first direction, and a support of a second guide is coupled to a second end of the elastic member to extend the elastic member in a second direction.

The grooves may allow the protrusion to turn at predetermined angles.

A groove of the first guide may allow the protrusion to turn in a second direction, and a groove of the second guide may allow the protrusion to turn in a first direction.

The apparatus may further include a stopper for preventing the guides from rotating in predetermined directions.

The stopper may prevent the first guide from rotating in a second direction and the second guide from rotating in a first direction.

The apparatus may further include a first stopper preventing a first guide of the plurality of guides from rotating in a direction opposite to a rotational direction of the rotary shaft when the first guide returns after rotating with the rotary shaft and preventing the first guide from rotating in the rotational direction of the rotary shaft when a second guide rotates with the rotary shaft. A second stopper prevents the second guide of the plurality of guides from rotating in the direction opposite to the rotational direction of the rotary shaft when the second guide returns after rotating with the rotary shaft and prevents the second guide from rotating in the rotational direction of the rotary shaft when the first guide rotates with the rotary shaft.

The apparatus may further include a controller configured to control the motor in accordance with a speed of a vehicle.

When the vehicle breaks down, the controller may stop the control.

According to an apparatus for driving a headlight cover, since shields are operated by a DC motor, manufacturing cost can be reduced in comparison to using a stepper motor.

Since an elastic member and a plurality of guides are used in the present disclosure, specific sensors for storing the positions of shields are not necessary, thus simplifying the structure and reducing the manufacturing cost.

Further, a stopper is used for preventing shields from rotating over a predetermined angle and enabling them to move/return to the exact initial positions, thus preventing from maloperation.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, an apparatus for driving a headlight cover according to exemplary embodiments of the present inventive concept will be described with reference to the accompanying drawings.

Figure 1:
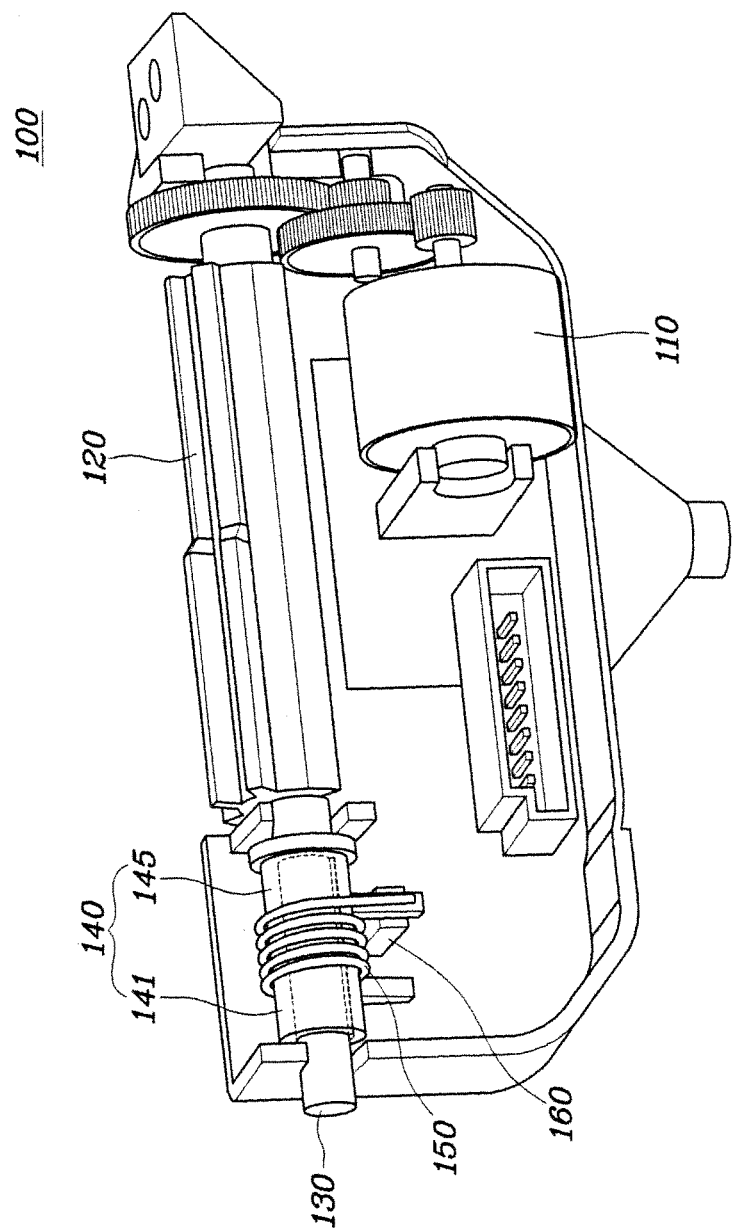
FIG. 1 is a view showing an apparatus for driving a headlight cover according to an embodiment of the present inventive concept.
Figure 2:
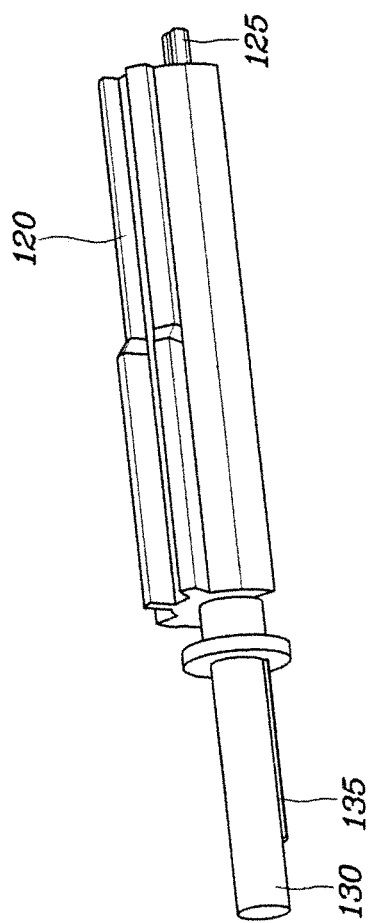
FIG. 2 is a perspective view showing shields and a rotary shaft according to an embodiment of the present inventive concept.
Figure 3:
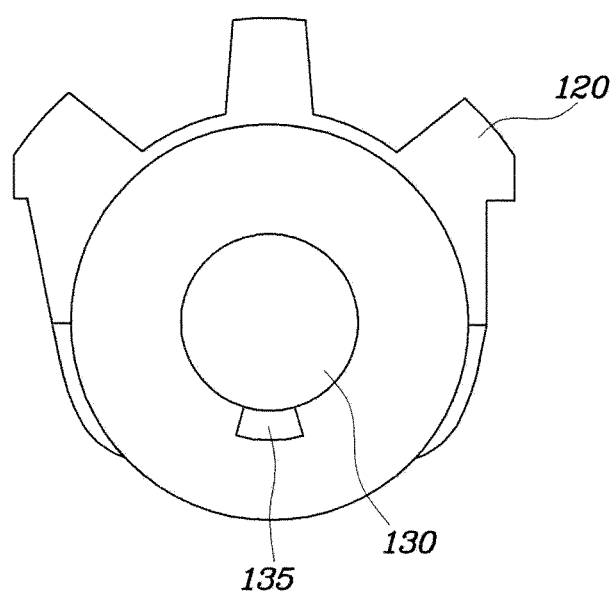
FIG. 3 is a front view showing the shields and the rotary shaft according to an embodiment of the present inventive concept.
Figure 4A:
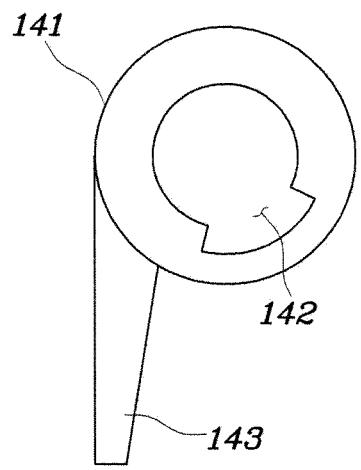
FIG. 4A is a view showing a first guide according to an embodiment of the present inventive concept.
Figure 4B:
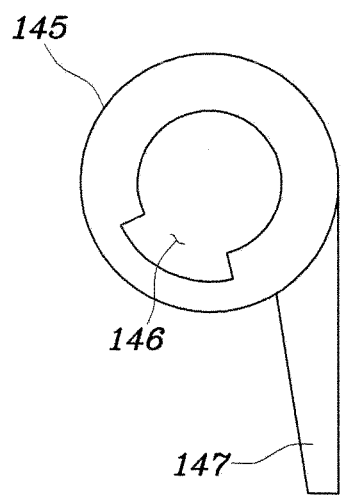
FIG. 4B is a view showing a second guide according to an embodiment of the present inventive concept.
Figure 5A:
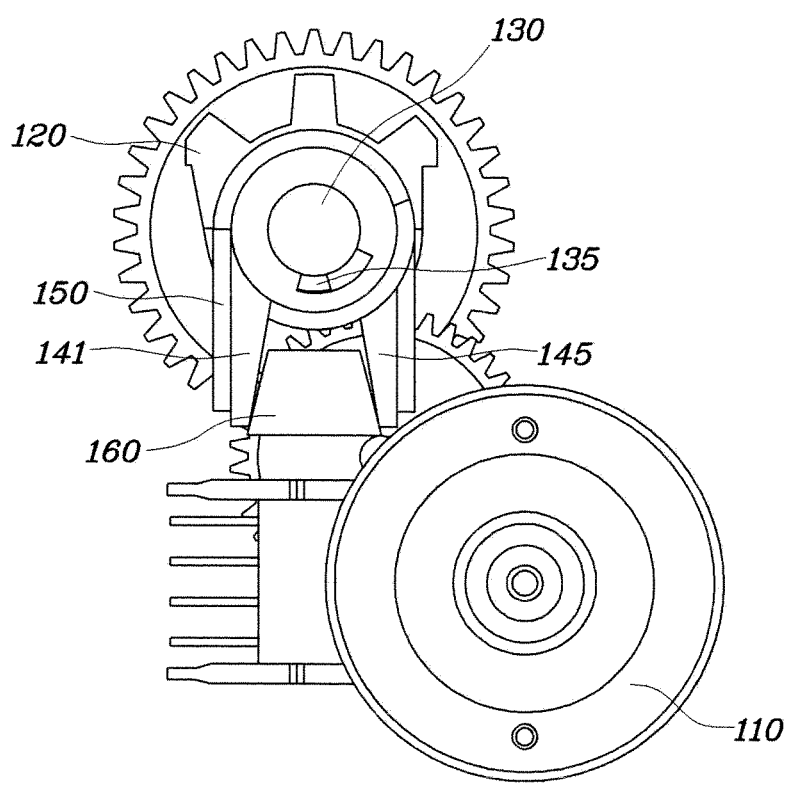
FIG. 5A is a view showing the apparatus for driving a headlight cover in a mode C according to an embodiment of the present inventive concept.
Figure 5B:
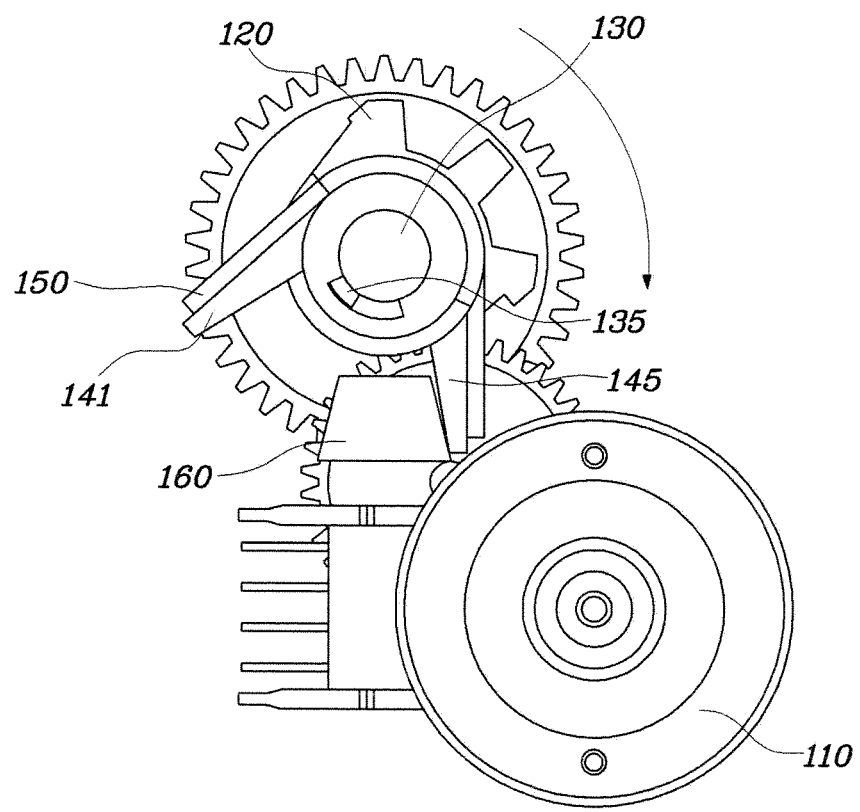
FIG. 5B is a view showing the apparatus for driving a headlight cover in a mode V according to an embodiment of the present inventive concept.
Figure 5C:
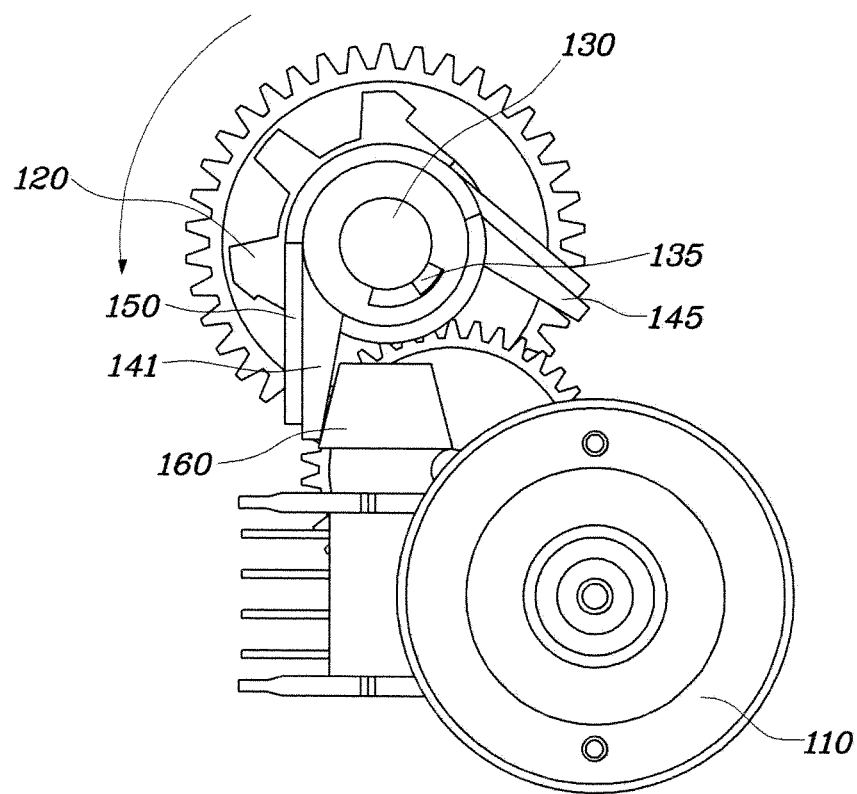
FIG. 5C is a view showing the apparatus for driving a headlight cover in a mode E according to an embodiment of the present inventive concept.

FIG. 1 is a view showing an apparatus for driving a headlight cover according to an embodiment of the present inventive concept, FIG. 2 is a perspective view showing shields and a rotary shaft according to an embodiment of the present inventive concept, FIG. 3 is a front view showing the shields and the rotary shaft according to an embodiment of the present inventive concept, FIG. 4A is a view showing a first guide according to an embodiment of the present inventive concept, FIG. 4B is a view showing a second guide according to an embodiment of the present inventive concept, FIG. 5A is a view showing the apparatus for driving a headlight cover in a mode C according to an embodiment of the present inventive concept, FIG. 5B is a view showing the apparatus for driving a headlight cover in a mode V according to an embodiment of the present inventive concept, and FIG. 5C is a view showing the apparatus for driving a headlight cover in a mode E according to an embodiment of the present inventive concept.

Referring to FIGS. 1 to 5C, an apparatus 100 for driving a headlight cover may include a rotary shaft 125 that rotates by a motor 110 and is covered with shields 120. A rotary member 130 extends from the rotary shaft 125, rotates with the rotary shaft 125, and has at least one protrusion 135 on its surface. A plurality of guides 140 are fitted around the rotary member 130 and have grooves 142 and 146 on their inner sides, respectively, to receive the protrusion 135 of the rotary member 130. An elastic member 150 is fitted on the guides 140. The motor 110 may be a DC motor.

The guides 140 are arranged in parallel on the rotary member 130 and rotate selectively in accordance with the rotational directions of the rotary shaft 125 rotating by the motor 110. For example, when the rotary shaft 125 rotates in a first direction by the motor 110, only a first guide 141 of the guides 140 rotates in the first direction by the protrusion 135 of the rotary member 130. On the other hand, when the rotary shaft 125 rotates in a second direction by the motor 110, only a second guide 145 of the guides 140 rotates in the second direction by the protrusion 135 of the rotary member 130. The detailed configuration and operation will be described below.

One protrusion 135 may be formed on the rotary member 130 to be inserted into the grooves 142 and 146 of the guides, or a plurality of protrusions 135 may be formed to be inserted into the grooves 142 and 146 of the guides, respectively.

In the present disclosure, the first and second guides 141 and 145 further have supports 143 and 147, respectively, which extend the elastic member 150 when the guides 140 rotate with the rotary shaft 125. The support 147 of the second guide 145 is coupled to a second end of the elastic member 150 to extend the elastic member 150 in the second direction, and the support 143 of the first guide 141 is coupled to a first end of the elastic member 150 to extend the elastic member 150 in the first direction.

In detail, the elastic member 150 is fitted around the guides 140 and coupled to the supports 143 and 147 of the guides 140. For example, when the second guide 145 rotates in the second direction by the motor 110, the first end of the elastic member 150 rotates accordingly. In this process, the first guide 141 coupled to the first end of the elastic member 150 does not rotate, such that the elastic member 150 extends by the rotation of the second guide 145 and a returning force is generated in a direction opposite to the rotational direction of the motor 110. On the other hand, when the first guide 141 rotates in the first direction by the motor 110, the first end of the elastic member 150 rotates accordingly, and the second guide 145 coupled to the second end of the elastic member 150 does not rotate, such that the elastic member 150 is extended by the rotation of the first guide 141 and a returning force is generated in the direction opposite to the rotational direction of the motor 110.

Accordingly, when torque of the motor 110 is removed, the shields 120 return to initial positions by the returning force of the elastic member 150. That is, it is possible to return the shields 120 to the initial positions, even without sensors for storing rotational positions of the shields 120, as in the related art.

The grooves 142 and 146 of the guides 140 allow the protrusion 135 to turn at predetermined angles, so that the groove 142 of the first guide 141 allows the protrusion 135 to turn in the second direction, and the groove 146 of the second guide 145 allows the protrusion 135 to turn in the first direction.

For example, referring to FIG. 4A, the groove 142 of the first guide 141 defines a space in which the protrusion 135 of the rotary member 130 is inserted and turns in the second direction (counterclockwise in the figure). At an early stage of operation, the protrusion 135 is positioned at the left end of the groove 142. When the protrusion 135 turns in the second direction by the motor 110, it just turns along the groove 142 of the first guide 141, but does not rotate the first guide 141. When the protrusion 135 turns in the first direction by the motor 110, it rotates the first guide 141 in the first direction.

On the other hand, referring to FIG. 4B, the groove 146 of the second guide 145 defines a space in which the protrusion 135 of the rotary member 130 is inserted and turns in the first direction (clockwise in the figure). The operation way is opposite to that of the first guide 141. According to this configuration, a plurality of guides can rotate selectively in accordance with the rotational directions of the motor 110.

The present disclosure further includes a stopper 160 for stopping rotation of the guides 140 in predetermined directions. The stopper 160 prevents the first guide 141 of the guides from rotating in the second direction and the second guide 145 from rotating in the first direction.

Another embodiment may further include a first stopper that prevents the first guide 141 of the guides from rotating in the direction opposite to the rotational direction of the rotary shaft 125 when it returns after rotating with the rotary shaft 125 and prevents the first guide 141 from rotating in the rotational direction of the rotary shaft 125 when the second guide 145 rotates with the rotary shaft 125. A second stopper prevents the second guide 145 of the guides from rotating in the direction opposite to the rotational direction of the rotary shaft 125 when it returns after rotating with the rotary shaft 125 and prevents the second guide 145 from rotating in the rotational direction of the rotary shaft 125 when the first guide 141 rotates with the rotary shaft 125.

The stopper 160 is coupled to a housing (not shown) and may be disposed at a side of the supports 143 and 147 of the first guide 141 and the second guide 145 to prevent their rotation. Alternatively, a plurality of stopper 160 may be disposed at sides of the supports 143 and 147 of the first guide 141 and the second guide 145.

According to this configuration, it is possible to prevent the guides 140 from being rotated over a predetermined angle by the driving force of the motor or from being rotated in the direction opposite to the rotational direction of the rotary shaft 125 by the returning force of the elastic member.

The present disclosure further includes a controller that controls the motor 110 on the basis of a speed of a vehicle, and when a vehicle breaks down, the controller can stop the control.

For example, when headlights are turned off or an engine stops in a vehicle or when a speed of the vehicle is within a range for a normal mode, the controller may not operate the shields 120, thus a beam pattern in a mode C can be used as shown in FIG. 5A. Further, when the speed of the vehicle is within a range for a downtown mode, the controller operates the shields 120 so that a mode V with a length of a beam pattern smaller than that in the mode C is performed as shown in FIG. 5B. In contrast, when the speed of the vehicle is within a range for a high-speed mode, the controller operates the shields 120 so that a mode E with the length of a beam pattern larger than that in the mode C is performed as shown in FIG. 5C.

The range for the normal mode is higher than the range for the downtown mode and lower than the range for the high-speed mode. The mode V or the mode E may be converted into a high-beam mode and the high-beam mode may have a beam pattern longer than the mode V.

According to an apparatus for driving a headlight cover which has the structure described above, since shields are operated by a DC motor, manufacturing cost can be reduced in comparison to using a stepper motor.

Since an elastic member and a plurality of guides are used, the present disclosure can be achieved even without sensors for storing positions of shields, so the structure can be simplified and manufacturing cost can be reduced.

Further, a stopper is provided for preventing shields from rotating over a predetermined angle and enabling them to move/return to the exact initial positions, thus preventing maloperation.

Although an exemplary embodiment of the present invention has been described for illustrative purposes, those skilled in the art will appreciate that various modifications, additions and substitutions are possible, without departing from the scope and spirit of the disclosure as disclosed in the accompanying claims.

What is claimed is:

1. An apparatus for driving a headlight cover, comprising:
   a rotary shaft rotating by a motor and covered with shields;
   a rotary member extending from the rotary shaft, the rotary member rotating with the rotary shaft and having at least one protrusion on a surface thereof;
   a plurality of guides fitted around the rotary member and having grooves on inner sides thereof, respectively, to receive the protrusion of the rotary member; and
   an elastic member fitted on the guides.

2. The apparatus of claim 1, wherein the motor is a direct-current (DC) motor.

3. The apparatus of claim 1, wherein each of the guides further has a support which extends the elastic member when the guides rotate with the rotary shaft.

4. The apparatus of claim 3, wherein a support of a first guide of the plurality of guides is coupled to a first end of the elastic member to extend the elastic member in a first direction, and a support of a second guide is coupled to a second end of the elastic member to extend the elastic member in a second direction.

5. The apparatus of claim 1, wherein the grooves allow the protrusion to turn at predetermined angles.

6. The apparatus of claim 5, wherein a groove of a first guide of the plurality of guides allows the protrusion to turn in a second direction, and a groove of a second guide allows the protrusion to turn in a first direction.

7. The apparatus of claim 1, further comprising a stopper preventing the guides from rotating in predetermined directions.

8. The apparatus of claim 7, wherein the stopper prevents a first guide of the plurality of guides from rotating in a second direction and a second guide from rotating in a first direction.

9. The apparatus of claim 1, further comprising:
   a first stopper preventing a second guide of the plurality of guides from rotating in a direction opposite to a rotational direction of the rotary shaft when the second guide returns after rotating with the rotary shaft and preventing the second guide from rotating in the rotational direction of the rotary shaft when a second guide rotates with the rotary shaft; and
   a second stopper preventing the second guide of the plurality of guides from rotating in the direction opposite to the rotational direction of the rotary shaft when the second guide returns after rotating with the rotary shaft and preventing the second guide from rotating in the rotational direction of the rotary shaft when the second guide rotates with the rotary shaft.

10. The apparatus of claim 1, further comprising a controller controlling the motor in accordance with a speed of a vehicle.

11. The apparatus of claim 10, wherein when the vehicle breaks down, the controller stops the control.

12. The apparatus of claim 1, wherein the guides are arranged in parallel on the rotary member and rotate selectively in accordance with rotational directions of the rotary shaft rotating by the motor.

13. The apparatus of claim 7, wherein the stopper is disposed at a side of supports of the guides.

* * * * *